Figure 1:
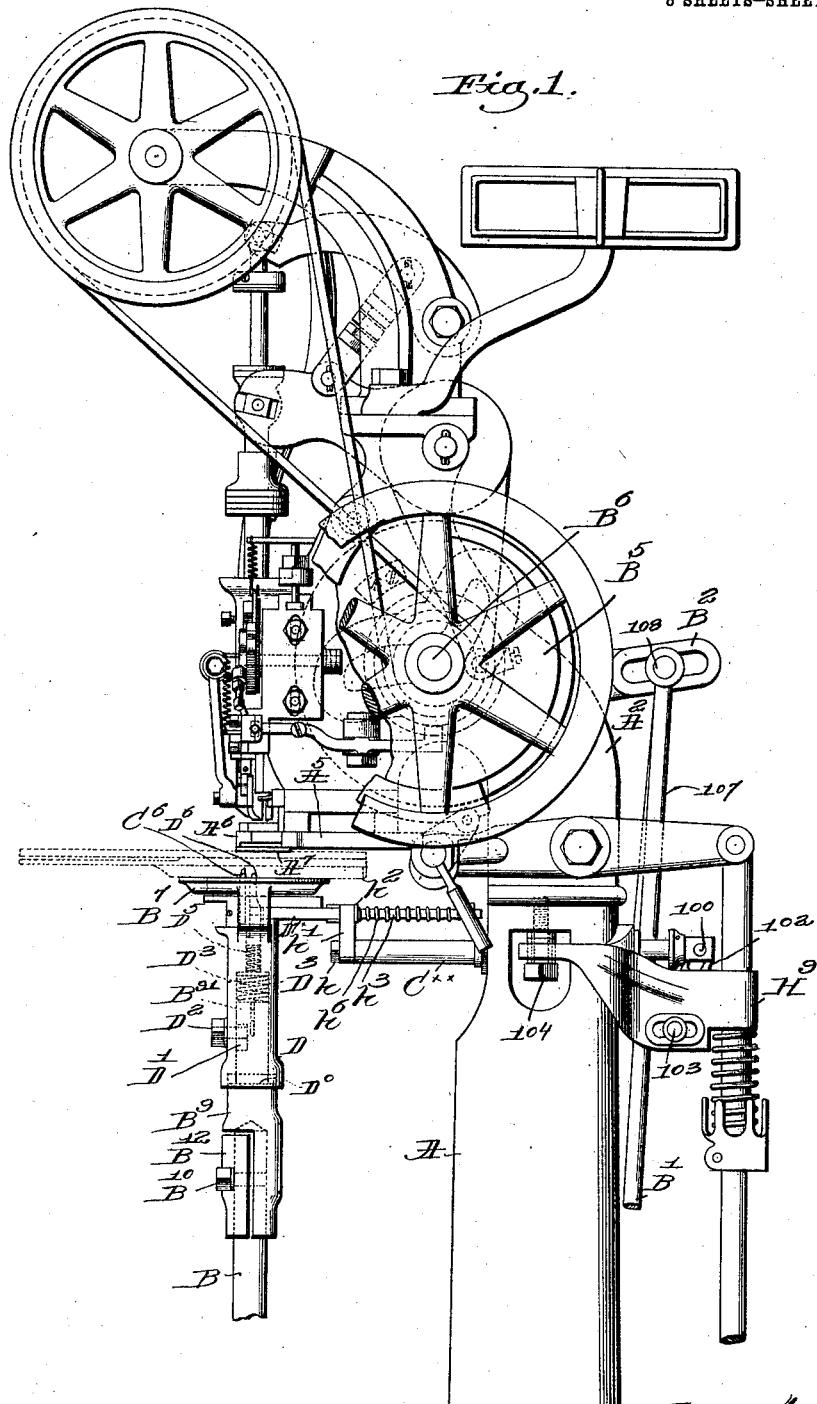

G. A. AMBLER.
MACHINE FOR INSERTING PROTECTORS.
APPLICATION FILED SEPT. 18, 1907.

1,030,760.

Patented June 25, 1912.

8 SHEETS—SHEET 1.

Witnesses:
Fred S. Greenleaf
Thomas J. Drummond

Inventor.
George A. Ambler,
By Crosby Gregory
Attys.

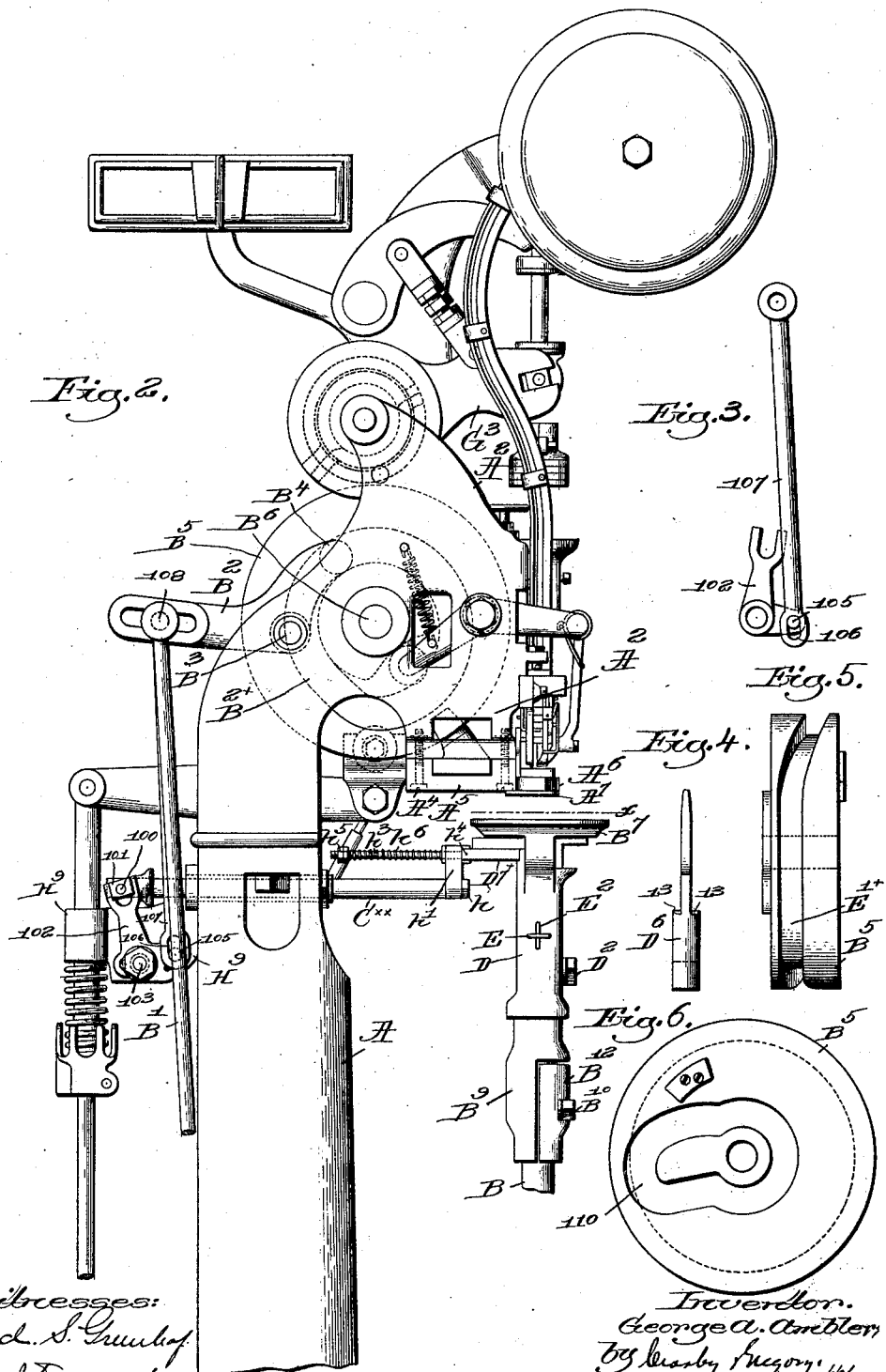

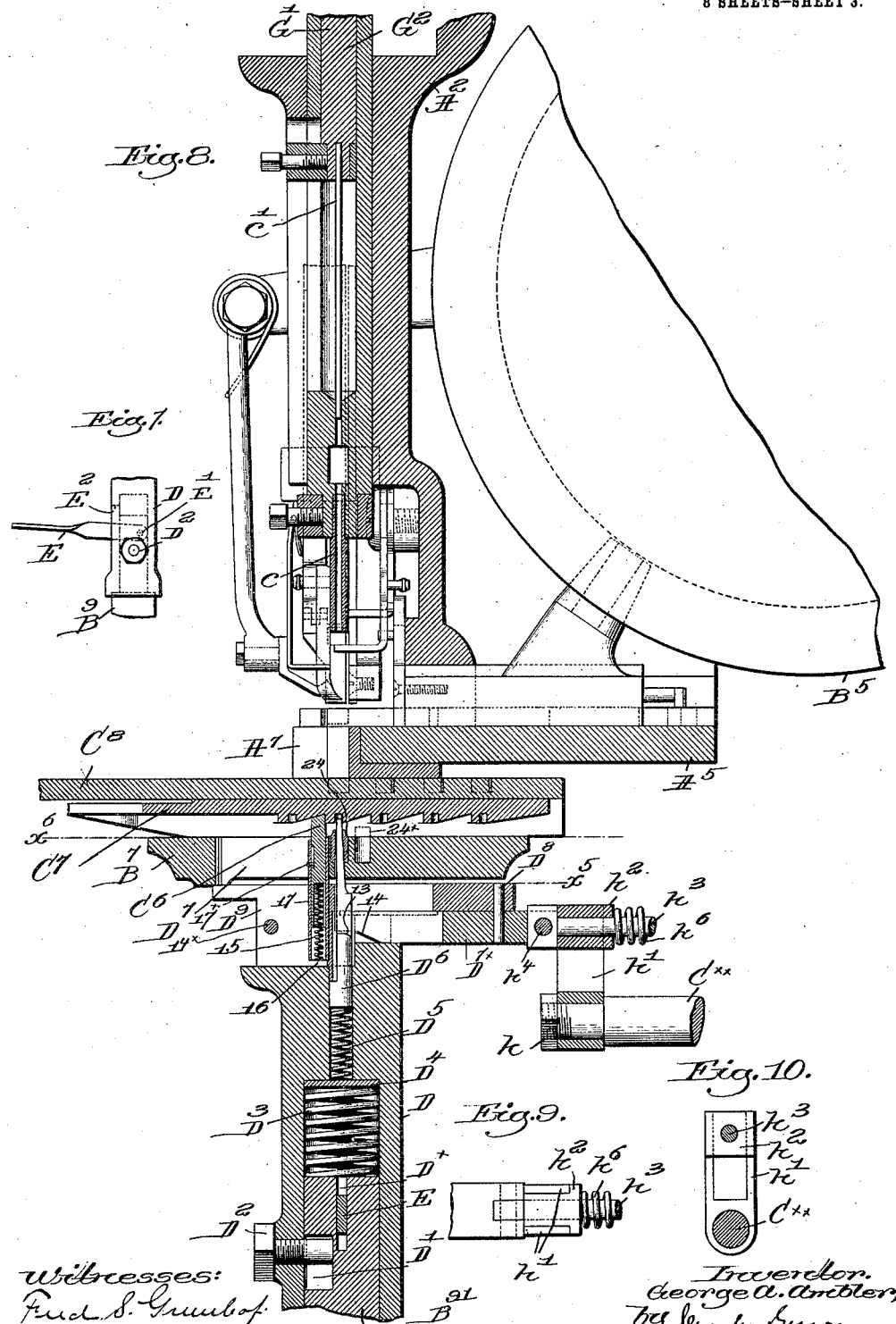

G. A. AMBLER.
MACHINE FOR INSERTING PROTECTORS.
APPLICATION FILED SEPT. 18, 1907.
1,030,760.
Patented June 25, 1912.
8 SHEETS—SHEET 4.
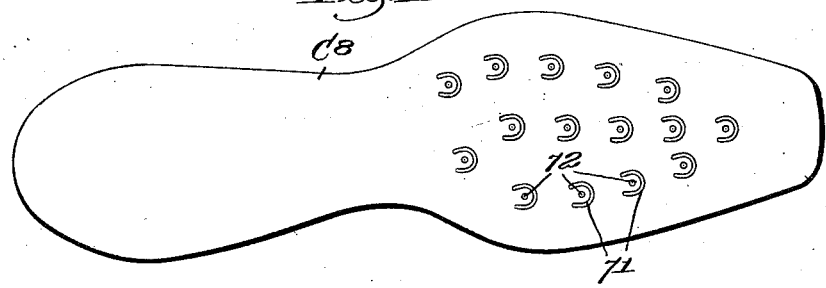
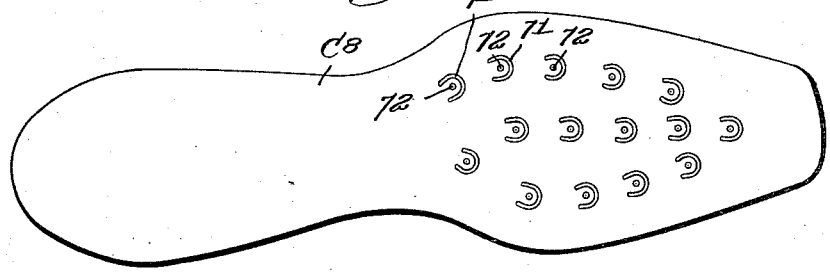
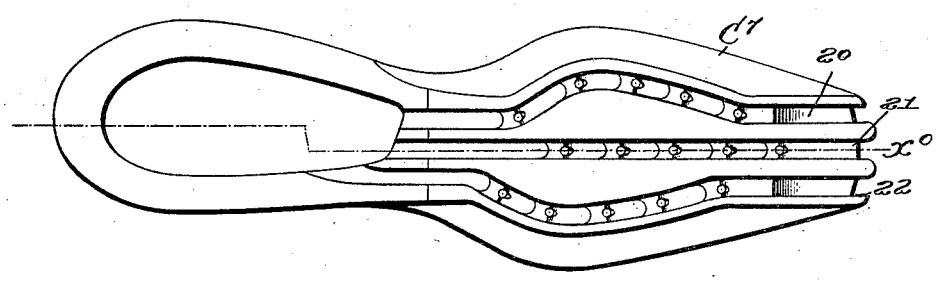
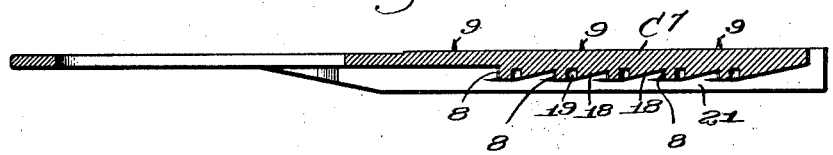

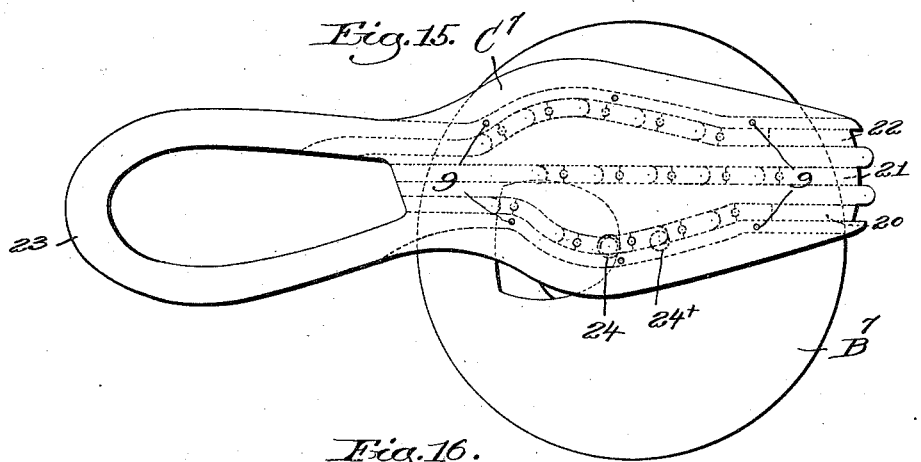
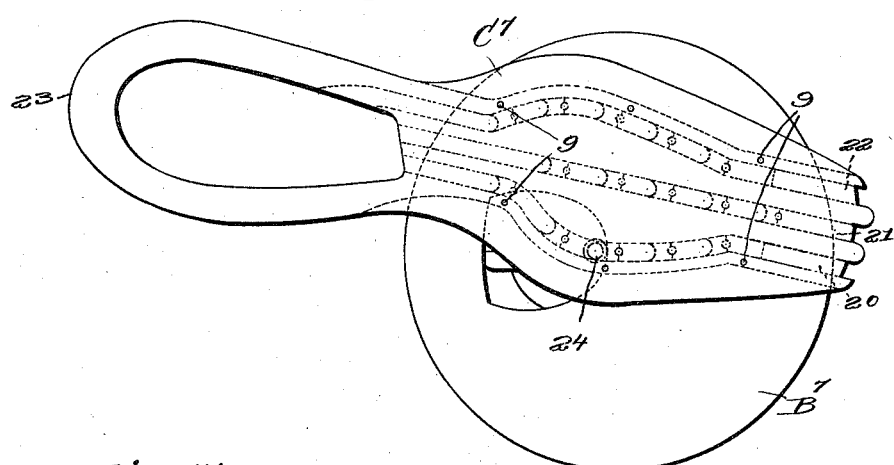
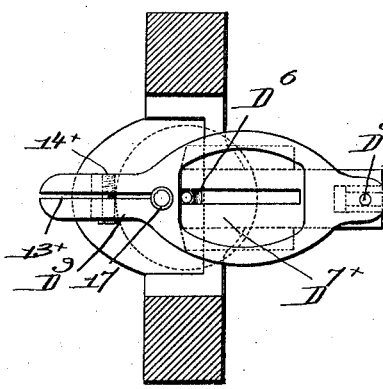
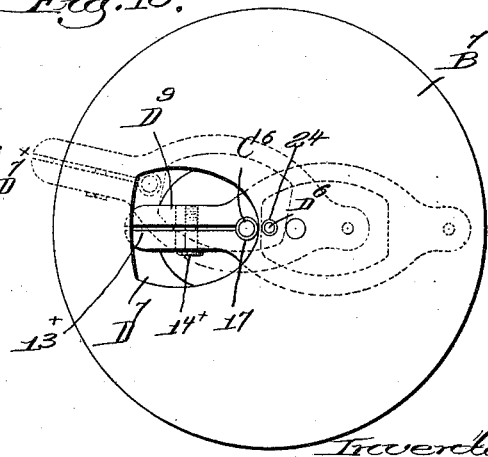

G. A. AMBLER.
MACHINE FOR INSERTING PROTECTORS.
APPLICATION FILED SEPT. 18, 1907.
1,030,760.
Patented June 25, 1912.
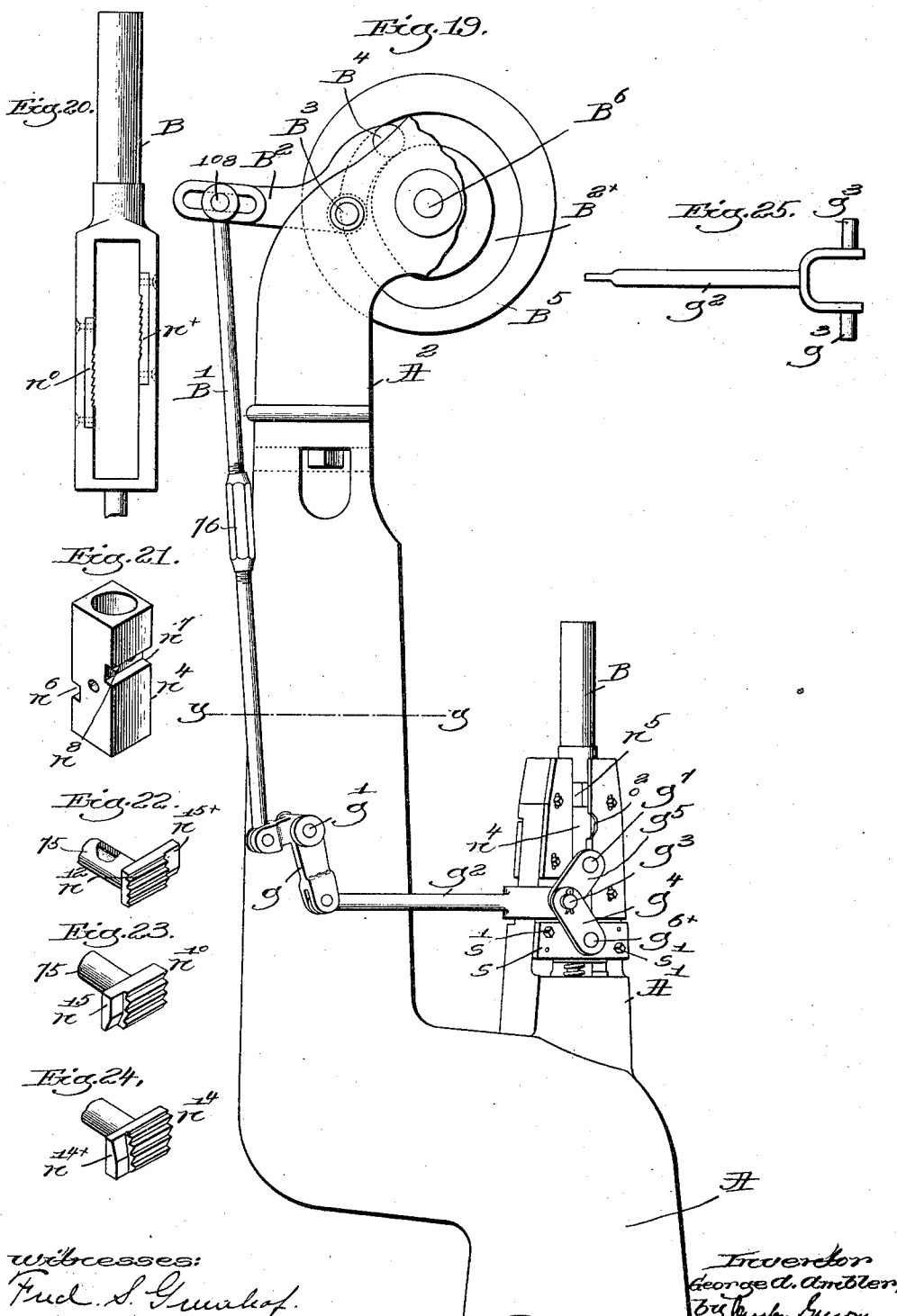

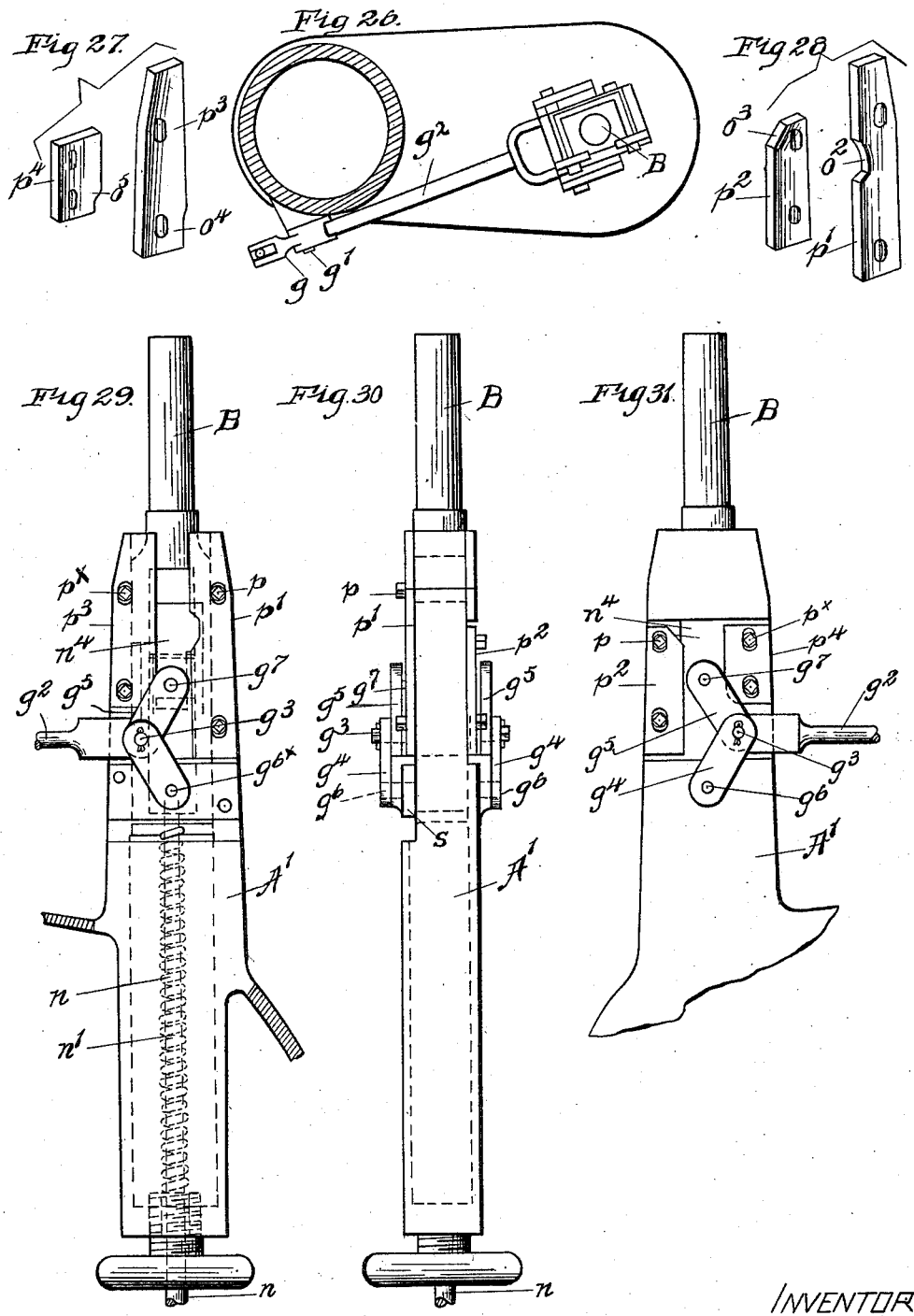

G. A. AMBLER.
MACHINE FOR INSERTING PROTECTORS.
APPLICATION FILED SEPT. 18, 1907.
1,030,760.
Patented June 25, 1912.
8 SHEETS—SHEET 8.
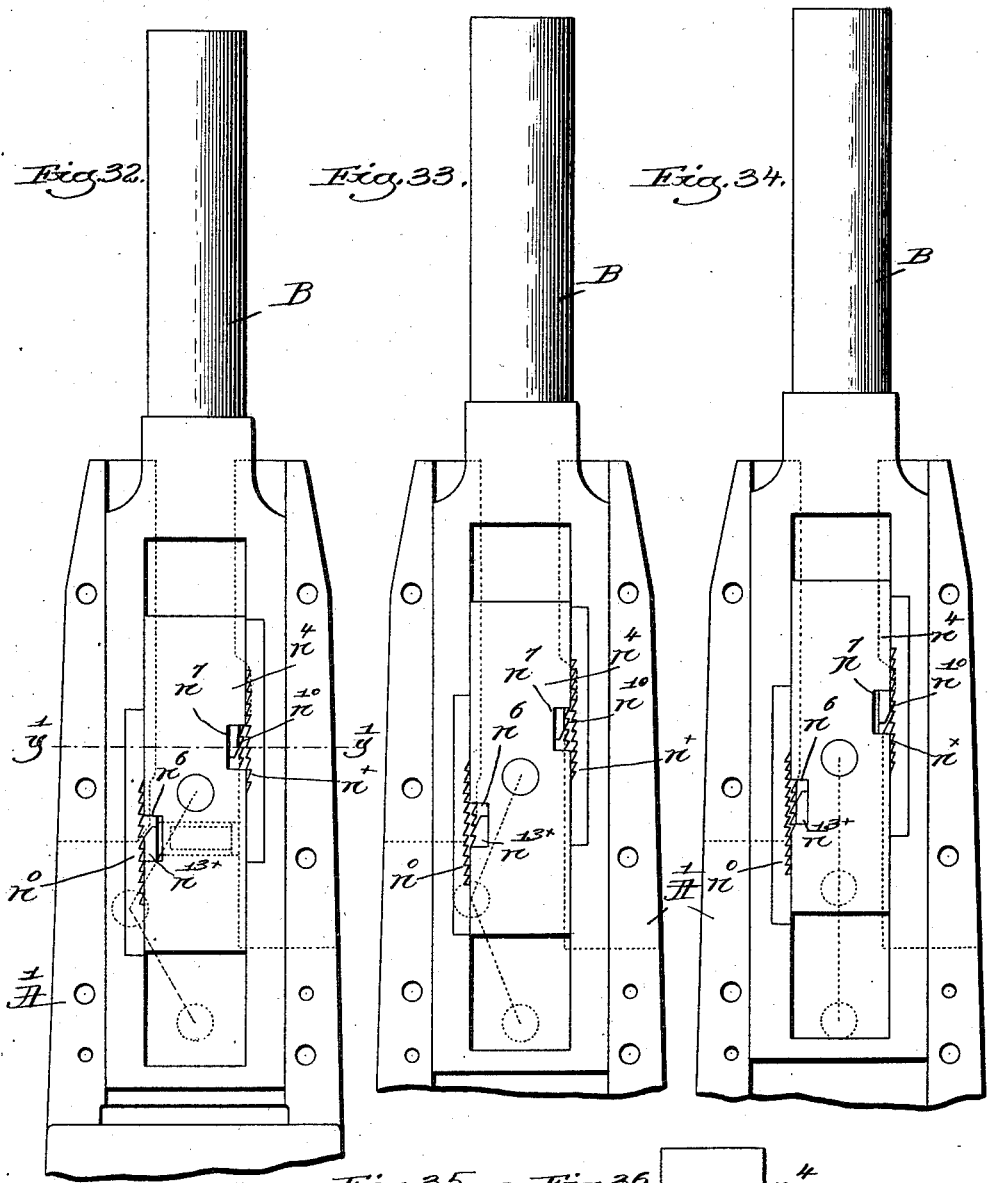
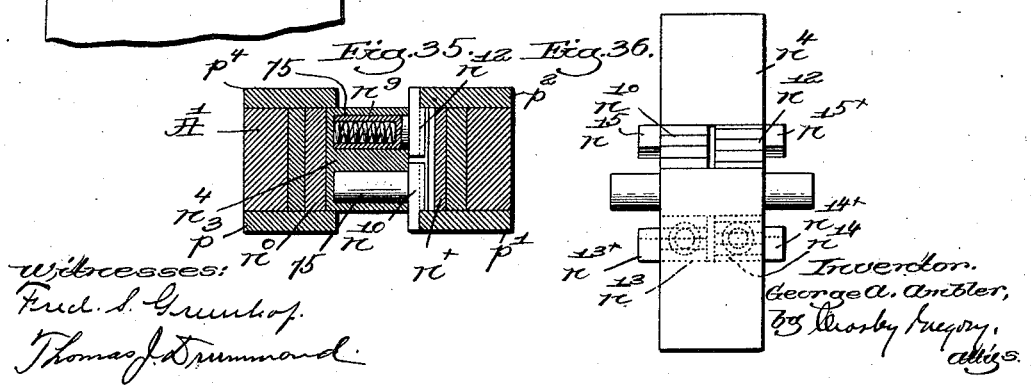

UNITED STATES PATENT OFFICE.

GEORGE A. AMBLER, OF WINCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR INSERTING PROTECTORS.

1,030,760. Specification of Letters Patent. Patented June 25, 1912.

Original application filed November 9, 1903, Serial No. 180,296. Divided and this application filed September 18, 1907. Serial No. 393,477.

*To all whom it may concern:*

Be it known that I, GEORGE A. AMBLER, a citizen of the United States, and a resident of Winchester, in the county of Middlesex and State of Massachusetts, have invented an Improvement in Machines for Inserting Protectors, of which the following description, in connection with the accompanying drawing, is a specification, like letters on the drawing representing like parts.

This invention relates to machines for use in the manufacture of boots and shoes and particularly to work supports employed with such machines.

For convenience of illustration the invention is shown as embodied in a machine for inserting protectors and fastenings or slugs into the heels and soles of boots and shoes of the type disclosed in my co-pending application Ser. No. 180,296, filed Nov. 9, 1903, from which this application has been divided, but it will be understood that the invention is not restricted in its application to the machine herein shown or even to the illustrated type of machines.

One important feature of the invention is the provision of novel mechanism to control the movements of a pattern plate by which the stock is sustained and by which it is carried into different operative relations to the mechanism which operates thereon.

Another important feature of the invention is the provision of improved mechanism for controlling work supports which is especially applicable to those machines in which the work is fed over the work support between successive operations thereon and is clamped for each operation thereon and is released while the feeding over the work support takes place.

An object of the invention is to provide improved work support controlling mechanism which will give to the work support both a positive clamping movement and a positive releasing movement. Preferably this mechanism will comprise oppositely operating clutches, and in the illustrated embodiment these clutches are so combined with yielding means for maintaining the work support normally in work clamping position that the positive work clamping movement and the positive work releasing movement shall be uniform for successive operations.

Another object of the invention, therefore, is to provide work support controlling mechanism in which the positive work clamping movement is automatically accommodated to variations in the thickness of the work, preferably in combination with means for automatically accommodating the work releasing movement to the thickness of the work.

Another object of the invention is the provision in work support controlling mechanism constructed to give to the work support uniform work clamping movements and uniform work releasing movements of adjustments whereby the amount or extent of such uniform movements may be varied.

Other objects of the invention will be apparent from a consideration of the following description and claims in connection with the accompanying drawings in which,—

Figure 1 is a right hand side elevation of the upper part of a machine emdodying my invention in one of the best forms now known to me; Fig. 2 is a left side elevation of the machine shown in Fig. 1; Fig. 3 is a detail showing part of the device employed for feeding the pattern-plate; Fig. 4 shows detached the pattern-plate locking device; Fig. 5 is an edge view of the cam for moving the protector-carrier and actuating the driver and the ejector; Fig. 6 is a side view of the cam shown in Fig. 5 looking at the same from the right; Fig. 7 is a detail of the lever E; Fig. 8 is a partial vertical section taken longitudinally through the fastener driver and the protector-driver and through the table and the pattern-plate; Figs. 9 and 10 are details of part of the mechanism for moving the slide-bar $D^{7x}$; Figs. 11 and 12 show stock represented as soles in which the protectors have been driven in accordance with a predetermined pattern, the figures also showing fastenings inserted in the stock within the protectors; Fig. 13 is an under side view of a pattern-plate of one desirable construction, the pattern being intended to produce the arrangement of protectors represented in Figs. 11 and 12; Fig. 14 is a section in the line $x^0$, Fig. 13; Fig. 15 represents the pattern-plate of Fig. 13 right side up with the stock removed, showing two guide-pins in operative position in the outer guiding groove of the pattern-plate; Fig. 16 is a view similar to Fig. 15 but with a single guide-pin in operative position; Fig. 17 is a section below the line $x^5$, Fig. 8, the parts being shown in the position they will occupy when the central groove of the pattern-plate is being used; Fig. 18 is a view below the section line $x^6$, Fig. 8, the dotted lines showing the parts in the position they will occupy when one of the curved side grooves of the pattern-plate is being used; Fig. 19 shows in left hand side elevation a part of the head and column with the cam-shaft and cam to move the lever $B^2$ and the parts actuated thereby to raise and lower the spindle carrying the work support or table; Fig. 20 shows the spindle detached; Fig. 21 shows the block detached from the spindle and its pawls omitted; Figs. 22 and 23 show one pair of the pawls detached and enlarged; Fig. 24 shows pawl $n^{14}$ detached; Fig. 25 is a plan view of link $q^2$ detached; Fig. 26 is a top or plan view below the section line $y$, Fig. 19; Figs. 27 and 28 show detached the pawl controllers for controlling the movement of the pawls of the pawl-carrier; Figs. 29 and 30 show portions of the column and the post $A'$ containing the spindle; Fig. 31 is a view of some of the parts that would be shown at the rear side Fig. 29; Figs. 32, 33 and 34 are details showing the ratchet mechanism, the spindle, block, and pawls employed therewith; Fig. 35 is a cross section in the line $y'$, Fig. 32; Fig. 36 is a view showing one side of the block with its two pawls in position.

The machine herein illustrated is arranged to drive protectors 71 and fastenings 72 into stock, as shown in Figs. 11 and 12, and the means for driving these protectors and fastenings herein shown is the same as that shown in my co-pending application Serial No. 180,296, filed November 9, 1903, and as such fastening-driving and protector-driving mechanism is fully described and claimed in said application and forms no part of the present invention, it will not be necessary to describe it herein.

The stock $C^8$ into which fastenings and protectors are to be driven, is supported by a pattern-plate $C^7$, which will be more fully described hereinafter. Said pattern-plate is sustained on a table $B^7$ over which table the pattern-plate is fed as the fastenings are driven. The table $B^7$ is sustained by a spindle or carrier B supported in a post $A'$ that is formed on the column A of the machine. The stock $C^8$, while being acted on, is held against an extension $A^6$ formed on a block $A^5$ which is supported by the head $A^2$ of the machine, said extension constituting a foot-plate against which the stock is sustained. The operative parts of the machine are driven from a main shaft $B^6$ which is supported in the head $A^2$, all as fully explained in my aforesaid co-pending application.

A cam hub $B^5$, see Figs. 2 and 5, carried by the main shaft $B^6$ has a cam groove $E^{1x}$ in its periphery and a groove $B^{2x}$ at one side, said groove receiving a roller stud $B^4$ of a lever $B^2$ pivoted at $B^3$ and receiving in a slot at the outer end thereof a stud 108 with which is connected a rod $B'$ jointed at its lower end, see Fig. 19, with an elbow lever $g$ mounted on a stud $g'$ extended from the column A. The lever $g$ has a connecting rod $g^2$ forked at its end, each branch of the fork having a projecting stud $g^3$, and on each stud is pivoted the ends of a pair of links $g^4$, $g^5$ forming toggles. The opposite lowermost links $g^4$ embrace loosely at their lower ends the one a stud $g^6$, see dotted lines Fig. 30, and the other a stud $g^{6x}$, see Fig. 19, extended from a plate $s$ secured to the post by screws $s'$.

The links $g^5$ embrace the opposite ends of a pin $g^7$ driven into a block or actuator $n^4$ adapted to be moved vertically in a slot $n^5$ in the spindle B by or through the movement of rod $g^2$, said spindle, as best shown in the detached view Fig. 20, being provided with ratchet toothed plates $n^0$ and $n^x$. The block $n^4$, see Fig. 21, showing the same detached, has grooves $n^6$, $n^7$, at its opposite sides, the bottom of each groove having holes $n^8$. The holes in the bottom of the groove $n^7$ receive the round shanks 75, see Fig. 35, which are hollow to contain springs $n^9$ of lifting pawls $n^{10}$, $n^{12}$, the heads of the pawls entering the groove $n^7$.

The holes in the groove $n^6$ receive the shanks of the two depressing pawls $n^{13}$, $n^{14}$ similar to the pawls $n^{10}$, $n^{12}$. The pawls $n^{10}$ $n^{12}$ have laterally extended ears $n^{15}$, $n^{15x}$, each having a cam at its lower edge, see Figs. 22 and 23, while the pawls $n^{13}$, $n^{14}$ have laterally-extended ears $n^{13x}$ and $n^{14x}$ having cams at hteir upper edges, as shown in Fig. 24, the springs of the pawls $n^{10}$ and $n^{12}$ forcing them into engagement with the ratchet plate $n^x$ while the springs of the pawls $n^{13}$ and $n^{14}$ force them into engagement with the teeth of the ratchet plate $n^0$.

The post $A'$ has secured to its opposite faces by screws $p$, see Figs. 29 and 30, pawl controllers in the form of plates $p'$, $p^2$, said plates being slotted that they may be adjusted to insure the action of the pawls at exactly the proper period. Said post also has connected with it at opposite sides by screws $p^x$ pawl controllers $p^3$, $p^4$ also made as plates and also slotted that they may be adjusted. These pawl-controllers are shown detached in Figs. 27 and 28. The pawls $n^{10}$, $n^{13}$ have each four teeth, as shown in Fig. 23, while the pawls $n^{12}$ and $n^{14}$ have three full and two half teeth, as seen in Figs. 22 and 24, to insure fine engagement of the teeth of the pawls with the teeth of said ratchet plates. As the block $n^4$ is lifted by the toggles $g^4$, $g^5$, the cam extensions $n^{15}$, $n^{15\times}$ of the pawls $n^{10}$, $n^{12}$ are permitted by the cut-away portions $o^2$, $o^3$ of the plates of the pawl controllers $p'$, $p^2$, see Fig. 28, to move outwardly and engage immediately the teeth of the ratchet plate $n^\times$, thus lifting the spindle B in unison with said block $n^4$, but when the movement of the block is reversed or the same is drawn downwardly by the movement of the connecting rod $g^2$ to the left, said cam extensions meet the cam surfaces $o^2$, $o^3$, of said pawl controllers and instantly the lifting pawls are disengaged from the teeth of the ratchet plate $n^\times$.

After the teeth of the lifting pawls have been disengaged from the plate $n^\times$ in the descent of the block $n^4$ the extensions $n^{13\times}$, $n^{14\times}$ of the depressing pawls $n^{13}$, $n^{14}$ under the action of the pawl-moving springs enter the cut-away portions $o^4$, $o^5$, of the pawl controllers $p^3$, $p^4$, see Fig. 27, and engage the teeth of the ratchet plate $n^0$, depressing the spindle B against the stress of spring $n'$ surrounding the rod $n$ connected to the lower end of said spindle, see Fig. 29. The engagement of the pawls with the ratchet plates may be made sooner or later by adjusting the relative positions of the pawl controllers on the posts by loosening the screws $p^\times$, $p^\times$. Whenever the block $n^4$ is moved upwardly by the toggles for a sufficient distance to cause the cam shaped edges of the extensions $n^{13\times}$, $n^{14\times}$ of pawls $n^{13}$, $n^{14}$ to meet the cam surfaces $o^4$, $o^5$ of the pawl controllers $p^3$, $p^4$, the depressing pawls are immediately withdrawn, it being remembered that the pawls $n^{10}$, $n^{12}$, were withdrawn at the previous descent of the block $n^4$ and are still held withdrawn by the pawl controllers $p'$, $p^2$. The spring surrounding the rod $n$ under this condition acts to raise the spindle with its connected ratchet toothed plates $n^\times$, $n^0$ until the stock carried by the pattern-plate to be described and sustained indirectly by the spindle B meets the foot plate $A^7$.

The action of the spring $n'$ is substantially instantaneous and effects the clamping of the work preparatory to inserting the protectors and fastenings therein by the means described in my said application, and immediately as the stock contacts with said foot plate the upward movement of the toggles continuing to raise the block $n^4$ causes the pawls $n^{10}$, $n^{12}$ to engage the teeth of the ratchet-plate $n^\times$ and further lift the spindle, the toggles $g^4$, $g^5$ at the completion of this movement being fully straightened and serving to lock the spindle B clamped while the protectors and fastenings are being inserted. The rod B' is made adjustable by or through a right and left hand threaded nut 76, see Fig. 19, that the rod $g^2$ may be moved the exact distance required to fully straighten the toggles and lock the spindle B in its elevated position. The spindle B sustains a stock-suport-holder $B^9$ which holder is provided with the extension $B^{91}$ of reduced diameter, said holder being formed with the shoulder $D^0$. The holder $B^9$ may be secured to the spindle by a clamping block $B^{12}$ and a clamping screw $B^{10}$. Said extension is provided with a notch or recess D'. The extension $B^{91}$ of the holder $B^9$ is embraced loosely by the hollow shank D of a stock support or table $B^7$, the upper end of said holder serving as a rest for a spiral spring $D^3$, that, through a buffer plate $D^4$, sustains said table, a stud $D^2$ in said shank entering a notch D' in the extension $B^{91}$ and limiting the extent of upward movement of the table under the action of said spring. A hand lever E extends through a slot $E^2$ in one side of the shank D, see Fig. 2, and the inner end of said lever occupies a slot $D^\times$ in the upper end of the extension $B^{91}$, said lever being pivoted to the extension at E', see Fig. 7.

To lower the table $B^7$ with relation to the throat or foot-plate for the introduction or removal of a pattern plate $C^7$ to be herein described, the free end of the lever E will be depressed and said lever by contact with the bottom of the slot $E^2$ will carry the shank D downwardly, compressing the spring $D^3$ while the shoulder $D^0$ will limit the descent of the shank, thus avoiding wear on the stud $D^2$. The buffer plate $D^4$ sustains a smaller spiral spring $D^5$ on which rests the lower end of a pattern-plate locking device $D^6$, see Fig. 8, and detached Fig. 4, it having shoulders 13, said device being free to be slid vertically in a guide-pin 24 sustained by the table $B^7$ and adapted to enter either of the grooves 20, 21 or 22 in the pattern-plate $C^7$, see Fig. 13. The pattern-plate is provided at its upper side with pins 9 on which are impaled the stock $C^8$ shown in Figs. 11 and 12, as soles for shoes, said figures showing protectors and fastenings or slugs driven thereinto as provided for in my said application.

The bottom of each groove 20, 21 and 22 has a series of inclines 18, see Fig. 14, provided with holes 19 and presenting shoulders 8, said locking device engaging at times said holes 19 while a feeding device $C^6$ shown best in Fig. 8 engages at times said shoulders, one after the other. The feeding device $C^6$ is sustained by a spring 15 resting on a shoulder 16 of a feed block $D^9$, said feeding device entering loosely a tube 17 held in the inner end of a slot 13ˣ, see Figs. 17 and 18, of said feed block by a clamping screw 14ˣ, said tube projecting upwardly into an opening D⁷ in the table B⁷.

To prevent the feeding device escaping from the tube said device is notched, see Fig. 8, and said notch is entered by a pin 17ˣ sustained in the tube. Sometimes I may provide the table with a second guide-pin 24ˣ shown by dotted lines Figs. 15 and 8, it being used for a purpose to be hereinafter fully described.

The feed block D⁹ is pivoted at D⁸ on a slide bar D⁷ˣ forked at its end, see Fig. 17, to embrace the locking device D⁶, said slide bar having an inclined face 14 to act on the shoulders 13 of said locking device to depress the latter against the spring D⁵, thus withdrawing said locking device from a hole 19 to unlock the pattern-plate. The slide bar D⁷ˣ derives its movement from the lever B² before described through a connecting rod 107, see Figs. 2 and 3 hung on one end of a stud 108, said rod having at its lower end an elongated slot 106 that embraces a stud 105 of an elbow lever 102 mounted on a stud 103 on a bracket H⁹ connected with the column A by a bolt 104, said stud being adjustable in a slot in said bracket. The forked end of the lever 102 embraces a swivel-block 101 mounted on a stud 100 at the outer end of a rod Cˣˣ, said rod having connected to one end thereof by a screw $h$ a forked arm $h'$ that embraces the sides of a block $h^2$ surrounding loosely a rod $h^3$ jointed by pin $h^4$ to the outer end of a slide bar D⁷ˣ. The rod $h^3$ has at its end, see Fig. 2, a nut $h^5$ and is surrounded between said block and nut by a spiral spring $h^6$ that yields in case the feeding movement of the pattern plate is, for any reason obstructed, thus obviating breaking of the parts.

The movement of the slide-bar D⁷ˣ toward the front of the machine or to the left, Fig. 8, takes place while the spindle B is held up by its actuating device hereinbefore described, and while the stress of the spring D³ is temporarily increased and the protector and fastening or slug are being driven into the stock. As the slide bar is moved in this direction, its inclined faces 14 act on the shoulders 13 of the locking device and depress the latter, withdrawing its upper end from a hole 19 in the pattern-plate and thereafter in its further or final movement in the same direction the inclined upper end of the spring-sustained feeding device will slide off that one of the inclines 18 behind the incline having the hole 19 from which the locking device was just withdrawn, said feeding device at the end of its movement toward the front of the machine, under the action of spring 15, snapping behind the shoulder 8 of said incline. When the direction of movement of the slide bar is changed, that is, when the bar is moved backwardly from the front of the machine, the feeding device, by its engagement with said shoulder 8 imparts to the pattern-plate its feeding movement, which takes place while the drivers are being elevated. The elongated slot 106 in the rod 107 affords sufficient lost motion to enable the table B⁷ to rise fully and clamp the stock in position for the reception of a protector before the slide bar D⁷ˣ starts to move toward the front of the machine to engage a different shoulder of the pattern-plate. As the slide-bar and feed block complete their movement to the right, Fig. 8, in feeding the pattern-plate, the inclined faces 14 of the slide-bar retire from the shoulders 13 of the locking device and permit the latter to rise under the action of spring D⁵ that its upper end may enter a different hole 19 in the pattern-plate to hold the latter while another protector and slug are driven.

The particular shape of the grooves in the pattern-plate C⁷ may be varied according to the outline or design in which it is desired to insert the protectors and fastenings or slugs. The grooves shown in the drawings provide for inserting the protectors and fastenings in designs which are represented in Figs. 11 and 12, but it will be seen in Fig. 11 that the open ends of the outside row of protectors occupy different positions from the open ends of like protectors represented in Fig. 12.

When driving the protectors according to the design represented in Fig. 12, both guides 24, 24ˣ will be used, but in case the open ends of the protectors are to stand in substantially the same position throughout the driving of the entire lot of protectors, which I find preferable, then the guide 24ˣ will be omitted and the workman taking hold of the extended end 23 of the pattern-plate may swing said plate more or less to one side of the guide 24 to insure the insertion of the protectors with their open ends in the desired line. The bar D⁷ˣ has a movement only in a right line, but the feed block D⁹ pivoted to said bar by the pin D⁸ may be moved in the arc of a circle about said pin, as represented by dotted lines in Fig. 18.

When the protectors are being inserted in a straight line, as represented in the center row of protectors in Figs. 11 and 12, the feed block D⁹ will occupy the position shown by full lines in Figs. 17 and 18, but when the protectors are being inserted in other than straight lines, as represented by the outer rows of protectors in the stock, then the block D⁹ in its movement will be swung by hand about the pivot D⁸, as indicated by dotted lines Fig. 18, to cause the feed device C⁶ to engage the proper shoulders 8 of the pattern-plate to reciprocate the latter step by step in spacing the protectors. The distance between shoulders 8 of the pattern-plate may be varied according to the distance it is desired that the protectors shall be spaced apart in the stock. While the spindle B is being depressed through the action of the lever B² preparatory to feeding the pattern-plate and stock, as described, the spring D³ exerts a slight pressure through the sleeve to keep the support D⁷ elevated, thus holding the stock with light pressure against the foot-plate, thus insuring sufficient friction to prevent too much momentum in the movement of the pattern-plate and avoiding breaking the locking device D⁶ and wear on the pattern-plate.

The operation of the stock-feeding means above described will be readily apparent from what has preceded, and briefly stated is as follows:—The workman will impale the stock on the upper side of the pattern-plate, and will then place said pattern-plate upon the table B⁷, passing the free end of one of the slots in the pattern-plate over the guide on said table. The machine may then be set in operation, and the rod $g^2$ will be operated by the lever B², thereby straightening the toggles $g^4$, $g^5$. It will be understood that prior to the straightening of the toggles the depressing pawls are in engagement with the ratchet plate $n^0$. The first movement of the toggle instantly withdraws the depressing pawls from the ratchet plate $n^0$ above referred to, and permits the spring $n'$ to force the spindle B upwardly, causing the stock to be clamped between the pattern-plate and the foot-plate, and in the continued upward movement of the block $n^4$ the lifting pawls of said block engage the ratchet plate $n^x$ and cause the spindle and the parts carried thereby, including the pattern-plate, to be lifted a trifle further to effect the firm clamping of the stock, the completion of the straightening of the toggles locking the spindle in its elevated position. The spindle having thus been locked, thereby clamping the stock C⁸ between the pattern-plate and the foot-plate, the protector-driving and fastening-driving mechanisms are operated to drive the fastening and protector, all as fully described in my before-mentioned application, and as soon as the protector and fastening have been driven the lever B² is moved in a direction to break the toggles $g^4$, $g^5$ hereinbefore described, thus withdrawing the lifting pawls from the teeth of the ratchet plate $n^x$ and engaging the depressing pawls with the teeth of the plate $n^0$ to depress the latter, thereby to depress the spindle against the stress of the spring $n'$.

It will be noted that the lifting pawls and depressing pawls with their associated parts constitute oppositely operating clutches which operate in succession to raise and depress the work support and in some of the annexed claims the expression "oppositely operating clutches" will be used to describe mechanism for thus positively raising and positively depressing the work support.

The pattern-plate is fed backwardly from the front of the machine during the upward movement of the lever B² while the stock is released, and while the stock is clamped and the drivers are acting to drive a protector and a fastening into the stock, the slide-bar D⁷ˣ and feeding device are moved toward the front of the machine, the locking device being first withdrawn from its engagement with the pattern-plate, and thereafter the spring-sustained feeding device is moved forwardly along the incline of one of the grooves in the pattern-plate in which it is traveling until it slips behind a shoulder at the end of said incline. This puts the feeding device in position so that when the slide-bar and the feeding-block carrying the feeding device are again moved backwardly or away from the front of the machine, the feeding-device will take with it the pattern-plate, and at the end of the movement will permit the locking device to again enter a hole in and arrest the pattern-plate.

In the claims I shall designate the pawls or pins that engage the ratchet teeth of the stock-supporting spindle as clutching means.

Having described my invention, what I claim as new and desire to secure by Letters Patent is:—

1. In a machine of the class described, a stock-carrying pattern plate, a mechanism for feeding said plate, a work support, upon which said pattern plate is carried, means for actuating the work-support to clamp and to release the stock, and means whereby the feeding mechanism is operated by the work support actuating means to effect a step by step feeding of said plate between the work clamping operations.

2. An angularly movable pattern plate having at its under side a plurality of rows of similarly directed shoulders, said rows presenting different contours, and a reciprocating feeding device adapted to engage the shoulders in any one of said rows to feed the plate, said feeding device and said plate being relatively shiftable to bring any one of said rows into operative relation to said feeding device.

3. In a machine of the class described, an angularly movable stock-carrying pattern plate having at its under side a plurality of open-ended grooves of different contours which determine the path of movement of said plate, a support for the plate having a guide to enter either of said grooves, and means arranged to operate in said grooves to feed the plate.

4. In a machine of the class described, a stock carrying pattern plate having a groove and means for feeding, for locking and for guiding said pattern plate, all operating in said groove.

5. In a machine of the class described, an angularly movable stock-carrying pattern plate, a support therefor, a pivoted feeding block located below said support, and a feeding device carried by said block and adapted to engage and move the pattern plate over said support.

6. In a machine of the class described, a stock-carrying pattern plate having a plurality of grooves at its under side, a support for said plate, and a pivoted feeding block provided with a feeding device to engage and feed the pattern plate, the feeding block being arranged for movement about its pivot to enable the feeding device to enter any one of the grooves in the pattern plate.

7. A stock-carrying pattern plate, means to support said plate, means to engage and feed said plate, a locking device for locking the plate, means controlled by the feeding means to render the locking device inoperative while the feeding device is operating, and means to cause the locking device to operate at the completion of the feeding operation.

8. In a machine of the class described, a pattern plate having a series of shoulders and a series of holes upon the same face, a yielding spring-sustained feeding device, means to move said device in one direction to effect its engagement with the shoulder of said plate, and to then move the feeding device in the opposite direction to feed said plate, a spring-actuated locking device to enter one of said holes and lock said plate after each feeding stroke, and means to withdraw the locking device to free the plate to allow it to be fed.

9. A machine of the class described, having in combination, a work abutment, a stock supporting spindle movable toward and away from said abutment and a single means for positively moving said spindle toward said abutment and for positively moving said spindle away from said abutment comprising oppositely operating clutches constructed and arranged to engage directly said spindle and also arranged to partake of the operative movements of said means.

10. In a machine of the class described, the combination with a work support, and a single means for moving said work support into work clamping and then into work releasing position comprising oppositely operating clutches arranged to partake of the operative movements of said means, of means for varying the amount of work clamping movement of said work support and means for varying the amount of work releasing movement of said work support.

11. In a machine of the class described, the combination with a work support and a single means for moving said work support into work clamping and then into work releasing position comprising oppositely operating clutches arranged to partake of the operative movements of said means, of means for varying the amount of work clamping movement of said work support and independent means for varying the amount of work releasing movement of said work support.

12. A machine of the class described, having in combination, a work abutment, a stock supporting spindle, movable toward and away from said abutment, a spring arranged to maintain said spindle normally in stock supporting relation to said abutment, and a single means for positively moving said spindle toward said abutment and for positively moving said spindle away from said abutment comprising oppositely operating clutches constructed and arranged to engage directly said spindle and also arranged to partake of the operative movement of said means.

13. In a machine of the class described, a spindle having clutching surfaces, a block, means to move the same independently of the spindle, a plurality of clutches carried by said block and acting alternately as the block is moved in one or the other direction to engage the clutching surfaces on the spindle and move the spindle with it.

14. In a machine of the class described, a spindle having clutching surfaces, a block, means to move the same independently of the spindle, a plurality of clutches carried by said block and acting alternately as the block is moved in one or the other direction to engage the clutching surfaces on the spindle and move the spindle with it, means to disengage said clutches from said clutching surfaces, and a spring acting normally to raise said spindle when said clutches are disengaged from the clutching surfaces of the spindle.

15. A foot plate, a stock supporting spindle having ratchet teeth and movable toward and away from said foot plate, a stationary cam plate, a block provided with a spring-pressed pawl having a cam shaped extension, and means to reciprocate said block, the pawl in one direction of movement of the block engaging said ratchet teeth and moving said spindle with it, said cam acting to disengage said pawl from said ratchet teeth as the direction of movement of said block is changed.

16. A foot plate, a spindle having a plurality of sets of ratchet teeth and movable toward and away from said foot plate, a block, means to move it, spring-pressed pawls at opposite sides of said block, and means to control the horizontal movement of said pawls independently that one pawl may engage one set of ratchet teeth and move the spindle with it as the block is moved in one direction, and the other pawl may engage the other set of ratchet teeth and move the spindle with it when the block is moved in the opposite direction, thereby reversing the movement of the spindle.

17. In a machine of the class described, having a foot plate or work abutment, a work support, a reciprocating actuator to which said work support may be directly connected for movement therewith in the one or the other direction, and means for automatically connecting said work support and said actuator at predetermined times to effect alternately a clamping of the work between the foot plate and the work support and a release of the work sufficient to permit it to be fed.

18. In a machine of the class described, a work support, a reciprocating actuator to which said work support may be connected for movement therewith in either direction, means operating normally to maintain such connections, and means in the path of movement of the actuator for rendering said connections inoperative at predetermined times.

19. In a machine of the class described, a carrier, means constantly tending to move the carrier in one direction, a reciprocating actuator for raising and lowering said carrier, and connections between the carrier and the actuator comprising a plurality of separately operable devices carried by said actuator which are arranged for movement to render said connections inoperative.

20. In a machine of the class described, a carrier, a reciprocating actuator and connections between the carrier and the actuator for positively raising and lowering the carrier, said connections including a plurality of reversely acting clutching devices carried by said actuator and means for automatically throwing such clutching devices into and out of operation.

21. In a machine of the class described, a carrier or work support for positioning the work vertically, an actuator and normally operative connections between the work support and the actuator for automatically raising the carrier into work clamping position and for automatically lowering it into work feeding position at predetermined points in the cycle of operations, together with devices for selectively rendering said connections inoperative whereby said actuator is alternately operative and inoperative for moving the carrier during the continued operation of the machine.

22. In a machine of the class described, a carrier or work support for positioning the work vertically, a reciprocating actuator, connections for transmitting the movements of the actuator to the carrier, and means for operatively connecting and disconnecting the actuator to and from the carrier a plurality of times during each cycle of operations.

23. In a machine of the class described, a carrier or work support for positioning the work vertically, an actuator, normally operative connections between the carrier and the actuator for positively raising and for positively lowering the carrier, and means for interrupting said connections to permit independent movement of the carrier to accommodate varying thicknesses of work.

24. In a machine of the class described, a carrier, a reciprocable member positively connected to the carrier, a coöperating member for actuating said reciprocable member, a plurality of clutching devices on said coöperating member adapted to engage the reciprocable member, and means coöperating with each of said clutching devices for rendering them automatically operative and inoperative successively to cause them to connect and disconnect said members for moving the said carrier at desired times.

25. In a machine of the class described, a stock supporting spindle having a slot, an actuator operating in said slot, and means for clutching said actuator to the wall of said slot.

26. In a machine of the class described, a stock supporting spindle having a slot, an actuator operating in said slot and oppositely operating clutches for successively clutching said actuator to the wall of said slot.

27. In a machine of the class described, a stock supporting spindle, a reciprocating actuator, oppositely operating clutches carried by said actuator and adapted to engage said spindle, and means for causing said clutches to operate in appropriate relation to the movements of said actuator.

28. In a machine of the class described, the combination with a work support and a reciprocating actuator, of means tending normally to connect said work support to said actuator to cause said actuator to move said work support into work clamping position, means tending normally to connect said work support to said actuator to cause said actuator to move said work support into work releasing position, and independent and adjustable means for holding said connecting means out of operation at desired times in the cycle of operations of the machine, whereby the amount of work clamping movement of said work support and the amount of work releasing movement of said work support may be independently varied.

29. In a machine of the class described, the combination with a work support, of means for yieldingly pressing said work support normally into work clamping position, a reciprocating actuator, means acting normally to connect said actuator to said work support to effect a positive work clamping movement of said work support, means acting normally to connect said actuator to said work support to effect a positive releasing movement of said work support, and independent means for holding said connecting means out of operation constructed to operate in such succession that the work support is restored to the action of its spring between the positive movements.

30. In a machine of the class described, a work support, a toggle having a fixed pivot at one end, means for straightening and breaking said toggle, means for connecting the free end of said toggle to said work support to cause said work support to be moved positively in one direction, independent means for connecting the free end of said toggle to said work support to cause said work support to be moved positively in the other direction, and means for controlling the time of operation of said connecting means.

31. In a machine of the class described, a work support, a toggle having a fixed pivot at one end, means for straightening and breaking said toggle, means for connecting the free end of said toggle to said work support to cause said work support to be moved positively in one direction, independent means for connecting the free end of said toggle to said work support to cause said work support to be moved positively in the other direction, and adjustable means for controlling the time of operation of said connecting means.

32. In a machine of the class described, a work support movable between a work clamping position and a work releasing position, a toggle having a fixed pivot at one end, means for straightening and breaking said toggle, means for connecting the free end of said toggle to the work support to cause one of the movements of the work support to be effected during the straightening movement of the toggle, independent means for connecting the free end of said toggle to the work support to cause the other movement of the work support to be effected during the breaking movement of the toggle, and means for controlling the time of operation of said connecting means, with respect to the straightening and breaking movements of the toggle, independently adjustable to vary both the amount of work clamping movement of said work support and the amount of work releasing movement of said work support.

33. In a machine of the class described, a power shaft, a grooved cam upon said shaft, a work support and mechanism for actuating it operated by said cam and comprising a movable member connected with the work support, a second movable member positively connected with said cam, guiding means for said members constructed and arranged to cause them to move while substantially in engagement with each other in parallel paths, two clutching devices acting to lock said members together for movement alternately in opposite directions to effect respectively the clamping and the release of the work, independent manually adjustable stops for controlling automatically the operation of said clutching devices, and a spring to effect movement of the work support independent of the clutches to compensate for variations in the thickness of the work.

In testimony whereof I have signed my name to this specification in the presence of two subscribing witnesses.

GEORGE A. AMBLER.

Witnesses:
H. DORSEY SPENCER,
ARTHUR L. RUSSELL.

---

Copies of this patent may be obtained for five cents each, by addressing the "Commissioner of Patents, Washington, D. C."